United States Patent
Grove et al.

(10) Patent No.: US 12,358,018 B2
(45) Date of Patent: Jul. 15, 2025

(54) SYSTEMS AND METHODS OF FORMING A FLUID BARRIER

(71) Applicant: THE BOEING COMPANY, Chicago, IL (US)

(72) Inventors: Randy J. Grove, Tukwila, WA (US); Scott M. Livingston, Huntington Beach, CA (US); Dion P. Coleman, Issaquah, WA (US); Timothy L. Whiteaker, Newcastle, WA (US); Patrick J. Clayton, Costa Mesa, CA (US); Khalid S. Alshobber, Seattle, WA (US); Michael D. Atkins, San Clemente, CA (US); Trevor D. Garrett, Everett, WA (US)

(73) Assignee: The Boeing Company, Arlington, VA (US)

( * ) Notice: Subject to any disclaimer, the term of this patent is extended or adjusted under 35 U.S.C. 154(b) by 46 days.

(21) Appl. No.: 17/844,388

(22) Filed: Jun. 20, 2022

(65) Prior Publication Data

US 2022/0323994 A1 Oct. 13, 2022

Related U.S. Application Data

(62) Division of application No. 16/709,441, filed on Dec. 10, 2019, now Pat. No. 11,400,486.

(51) Int. Cl.
| | | |
|---|---|---|
| *B05D 7/00* | (2006.01) | |
| *B05D 3/02* | (2006.01) | |
| *B05D 3/10* | (2006.01) | |
| *B05D 3/12* | (2006.01) | |
| *C09D 5/00* | (2006.01) | |
| *C09D 175/02* | (2006.01) | |
| *C09D 175/04* | (2006.01) | |
| *C09D 181/04* | (2006.01) | |
| *C11D 7/26* | (2006.01) | |
| *C11D 7/40* | (2006.01) | |
| *C11D 7/50* | (2006.01) | |
| *C11D 11/00* | (2006.01) | |
| *C11D 17/06* | (2006.01) | |

(52) U.S. Cl.
CPC ............ *B05D 7/54* (2013.01); *B05D 3/0218* (2013.01); *B05D 3/101* (2013.01); *B05D 3/12* (2013.01); *C09D 5/002* (2013.01); *C09D 175/02* (2013.01); *C09D 175/04* (2013.01); *C09D 181/04* (2013.01); *C11D 7/268* (2013.01); *C11D 7/40* (2013.01); *C11D 7/50* (2013.01); *C11D 17/06* (2013.01); *C11D 2111/14* (2024.01); *C11D 2111/44* (2024.01)

(58) Field of Classification Search
CPC ........ B05D 7/54; B05D 3/0218; B05D 3/101; B05D 3/12; C09D 5/002; C09D 175/02; C09D 175/04; C09D 181/04; C11D 7/268; C11D 7/40; C11D 7/50; C11D 11/0023; C11D 11/0064; C11D 17/06
See application file for complete search history.

(56) References Cited

U.S. PATENT DOCUMENTS

| | | | | |
|---|---|---|---|---|
| 4,897,439 A | * | 1/1990 | Rau | C09D 127/12 524/508 |
| 2002/0011030 A1 | | 1/2002 | Williams et al. | |
| 2003/0150558 A1 | | 8/2003 | Lynn | |
| 2004/0059053 A1 | * | 3/2004 | Bremser | B82Y 30/00 524/847 |
| 2012/0258319 A1 | | 10/2012 | Mannari | |
| 2014/0134904 A1 | * | 5/2014 | Wang | B32B 5/10 442/1 |
| 2014/0348776 A1 | | 11/2014 | Palmer, Jr. et al. | |
| 2015/0275045 A1 | * | 10/2015 | Adachi | C08K 5/0091 427/314 |
| 2020/0298531 A1 | * | 9/2020 | Bertucelli | B32B 27/065 |

FOREIGN PATENT DOCUMENTS

| | | | | | |
|---|---|---|---|---|---|
| CN | 105442340 A | * | 3/2016 | | D01F 9/12 |
| EP | 3296361 A1 | * | 3/2018 | | C08F 2/22 |
| JP | 2008007012 A | * | 1/2008 | | |
| JP | 2010168878 A | * | 8/2010 | | |
| KR | 20060085447 A | * | 7/2006 | | |
| WO | WO-2015154214 A1 | * | 10/2015 | | B60B 3/10 |

OTHER PUBLICATIONS

Machine Translation of Kim et al. KR 20060085447 A (Year: 2006).*
Machine Translation of Wu et al. CN 105442340 A (Year: 2016).*
Portland Cement Association (PCA), "Cement & Concrete", https://www.cement.org/cement-concrete (Year: 2023).*
Portland Cement Association (PCA), "Aggregates", https://www.cement.org/cement-concrete/concrete-materials/aggregates (Year: 2023).*

(Continued)

*Primary Examiner* — Callie E Shosho
*Assistant Examiner* — Bethany M Miller
(74) *Attorney, Agent, or Firm* — Walters & Wasylyna LLC

(57) ABSTRACT

The present disclosure provides fluid barriers as well as systems and methods of forming fluid barriers. The method includes cleaning, via a blast media, a first side of a component and heating the component to a first temperature. Subsequently, the component is cleaned using a solvent. Subsequent to heating at least the component, a primer coating layer is formed on the first side of the component, and a topcoat layer is formed in contact with the primer coating layer. A primer coating material can be heated to a second temperature prior to formation of the primer coating layer. The first temperature can be different than the second temperature.

20 Claims, 4 Drawing Sheets

(56) References Cited

OTHER PUBLICATIONS

Machine Translation of Toyosawa (JP 2010168878 A) (Year: 2010).*
Astronomy.com, "In what part of the electromagnetic spectrum does the Sun emit energy?" Jul. 9, 2020. Accessed online, Apr. 10, 2024. https://www.astronomy.com/observing/in-what-part-of-the-electromagnetic-spectrum-does-the-sun-emit-energy/ (Year: 2020).*
Hano et al., "Selective reflection enhancement by controlling of surface-layering structure of inorganic nanoparticles on polymer microspheres", Mar. 20, 2022, Abstract, https://www.sciencedirect.com/science/article/pii/S0927775721020574 (Year: 2022).*
Machine Translation of Wakabayashi et al. (JP 2008007012 A) (Year: 2008).*

* cited by examiner

SYSTEMS AND METHODS OF FORMING A FLUID BARRIER

CROSS-REFERENCE TO RELATED APPLICATION

This application is a divisional application of U.S. patent Ser. No. 16/709,441, filed Dec. 10, 2019, which is hereby incorporated by reference herein.

FIELD

Aspects of the present disclosure relate generally to components of aircrafts and aircraft engines, and more particularly to the formation and refurbishment of aircraft components and aircraft engines.

BACKGROUND

Engine nacelles are housings connected to aircrafts that cover one or more engines on an aircraft. Air enters through an inlet of the nacelle, travels through the nacelle, and exits via the exhaust. Nacelle bodies include one or more fan cowls. Engine nacelles can include fluid barriers that protect the underlying components from debris. Fluid barrier formation can be time- and labor-intensive and costly, even more so when a component may be repaired or refurbished multiple times during its lifecycle. Accordingly, there is a need for more robust fluid barriers, as well as systems and methods for the formation thereof.

SUMMARY

The present disclosure provides a method of forming a fluid barrier in one aspect, including: cleaning, using a blast media, a first side of a component; heating the component to a first temperature; subsequently, cleaning the component using a solvent. The method further includes, forming a primer coating layer on the first side of the component, wherein the primer coating layer is formed while the component is at a second temperature different than the first temperature.

In one aspect, in combination with any example of forming a fluid barrier above or below, the method of forming a fluid barrier includes using a blast media comprising a wheat starch, a corn starch, or a polymer-based media. In another aspect, in combination with any example of forming a fluid barrier above or below, the method of forming a fluid barrier includes a first temperature and a second temperature in a range from about 120° F. to about 140° F. In one aspect, in combination with any example of forming a fluid barrier above or below, the method of forming a fluid barrier includes cleaning using the blast media by grit-blasting a plurality of three-dimensional structures formed from a composite material on the first side of the component.

In one aspect, in combination with any example of forming a fluid barrier above or below, the method of forming a fluid barrier includes heating a container of primer coating to a third temperature, the third temperature being from room temperature (68° F.-77° F.) to about 140° F. prior to forming the primer coating layer. In another aspect, in combination with any example of forming a fluid barrier above or below, the method of forming a fluid barrier includes a primer coating layer comprising polyurea or polysulfide.

In one aspect, in combination with any example of forming a fluid barrier above or below, the method of forming a fluid barrier includes forming a topcoat layer in contact with the primer coating layer, wherein the topcoat layer is formed from a reflective polyurethane material.

The present disclosure provides a method of forming a fluid barrier in one aspect, including: cleaning, via a blast media, a first side of a component; heating the component to a first temperature; and, subsequently, cleaning the component using a solvent. The method further includes: heating a primer coating material to a second temperature; subsequent to heating the component and the primer coating material, forming a primer coating layer on the first side of the component; and forming a topcoat layer in contact with the primer coating layer.

In one aspect, in combination with any example of forming a fluid barrier above or below, the method of forming a fluid barrier includes using a blast media comprising wheat starch, corn starch, or polymer-based media. In another aspect, in combination with any example of forming a fluid barrier above or below, the method of forming a fluid barrier includes a first temperature in a range from about 120° F. to about 140° F.

In one aspect, in combination with any example of forming a fluid barrier above or below, the method of forming a fluid barrier includes, subsequent to heating the primer coating material, at least one of: the second temperature being from room temperature (68° F.-77° F.) to about 140° F., or a viscosity of the primer coating material being from about 1500 centipoise to about 3300 centipoise. In another aspect, in combination with any example of forming a fluid barrier above or below, the method of forming a fluid barrier includes forming the primer coating layer from polyurea or polysulfide.

In one aspect, in combination with any example of forming a fluid barrier above or below, the method of forming a fluid barrier includes forming the topcoat layer from a reflective polyurethane material. In one aspect, in combination with any example of forming a fluid barrier above or below, the method of forming a fluid barrier includes spraying two or more interlayers of primer coating material to form the primer coating. In one aspect, the first temperature is greater than the second temperature.

The present disclosure provides an assembly in one aspect, including: a core layer formed as a first plurality of three-dimensional structures; an intermediate composite layer in contact with the core layer, the intermediate composite layer having a first side including a second plurality of three-dimensional structures. Further, a fluid barrier is formed over the first side of the intermediate composite layer, the fluid barrier comprising: a primer coating layer formed on the first side of the intermediate composite layer, and a topcoat layer formed on the primer coating layer.

In one aspect, in combination with any example assembly above or below, the assembly includes a primer coating layer comprising polyurea or polysulfide. In another aspect, in combination with any example assembly above or below, the assembly includes forming the topcoat layer from a reflective polyurethane.

In one aspect, in combination with any example assembly above or below, the assembly includes forming the primer coating layer from polyurea or polysulfide, and forming the topcoat layer from polyurethane. In another aspect, in combination with any example assembly above or below, the primer coating layer is from about 0.010" to about 0.030" in thickness. In still another aspect, in combination with any example assembly above or below, the topcoat layer is from about 0.0010" to about 0.0030" in thickness.

In another aspect, in combination with any example assembly above or below, the primer coating layer is formed from a plurality of primer coating interlayers, a first primer coating interlayer of the plurality of primer coating interlayers having a first thickness, and a second primer coating interlayer of the plurality of primer coating interlayers having a second thickness, wherein the first thickness is different than the second thickness.

In one aspect, in combination with any example assembly above or below, the assembly includes a primer coating layer formed as a continuous layer formed across an entire surface of a first side of the intermediate composite layer.

In another aspect, the second plurality of three-dimensional structures includes a plurality of voids, at least a portion of the plurality of voids being filled with the primer coating layer.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1A:
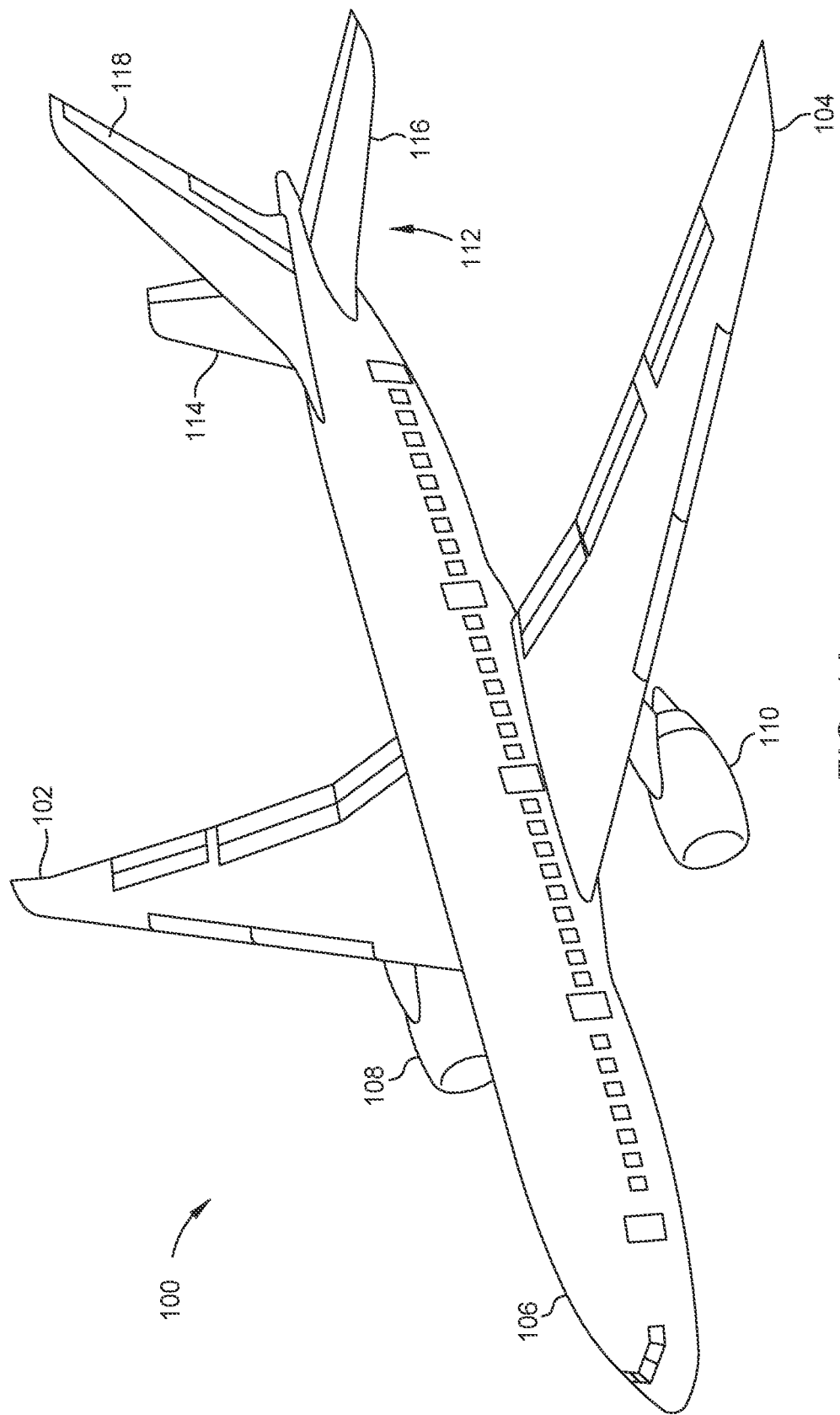
FIG. 1A is an example illustration of an aircraft including one or more fluid barriers according to aspects of the present disclosure.

The present disclosure relates to fluid barriers used to protect various components of aircrafts and aircraft engines, including housings in aircrafts. The fluid barriers discussed herein act to reduce or prevent fluid ingression during, for example, the use of an engine where one or more components including fluid barriers are part of an assembly. In one example, refurbishment of a fluid barrier on a component such as a panel on a fan cowl to protect one or more underlying portions of the component is disclosed. Refurbishment of the fluid barrier can occur when a previously formed fluid barrier is removed and replaced in whole or in part with a new fluid barrier. Previously employed fluid barriers can include a film or a tape that adheres to a first side of the component. When the component is in use, the first side of the component is exposed to fluids and other contaminants, including volatiles. Existing fluid barriers can allow fluid ingression, where water, oil, and other fluids can build up inside a housing, e.g., a panel on a fan cowl. Components such as fan cowl panels can include composite material and resin. The fluid and other contaminants can become trapped inside the component and can then weep or diffuse back into the panel surface of the fan cowl, compromising its integrity. The high pressure experienced by an aircraft in-flight can cause bubbles to form in the films as volatiles push against the film.

In addition to the challenges presented by tapes and film, current methods of removing and repairing the fluid barrier can compromise the three-dimensional structure on of the component, which can be formed from a composite material that includes fibers. Similarly, fluid ingression can damage the bond between the composite material and the resin in the core. The fluid barrier deteriorates over time and use, and undesirable bubbles or other deformities can form in the film or tape.

As discussed herein, a "thread" can be a combination of fibers woven in various configurations with other fibers. Threads and/or individual fibers may be assembled together in various configurations to form three-dimensional structures. Further, the other repair methods can cause the same component to be repaired multiple times during its life cycle; such repairs are both time and labor-intensive and, thus, can be costly.

Using the systems and methods discussed herein, an improved fluid barrier is formed. In one example, the formation of fluid barriers on components includes removing, when present, previous coatings or other contaminants, forming a primer coating layer on the component, and forming a topcoat on the primer coating. The fluid barrier is formed on a surface having a preserved three-dimensional structure. The fluid barriers discussed herein have improved bond strength and improved fluid sealing, which reduces the likelihood and severity of fluid ingression. The strength of the fluid barrier and its resistance to fissure formation in response to trapped fluid or air can be further improved by forming the fluid barrier during component cooling. In one example, when the component cools before or during formation of the primer coating layer, a pressure differential is created between the inside and the outside of the component. Because of this pressure differential, the air outside of the primer coating layer can migrate into the component and cause the primer coating material to be more efficiently pulled into voids including holes, crevices, pores, and other features of the three-dimensional structure. In one example, the component is heated prior to fluid barrier formation. As the component cools after heating and prior to the formation of the primer coating, air outside of the primer coating can migrate into the component. This migration causes the primer coating material, when applied, to be more efficiently pulled into voids including holes, crevices, pores, and other features of the three-dimensional structure, which creates improved adhesion of the fluid barrier to the component. In one example, at least a portion of the voids of the three-dimensional structure are filled with the primer coating material. A "portion" as used herein can include less than all of the voids in a three-dimensional structure. Improved adhesion of the fluid barrier to the component improves the protection provided by the fluid barrier to the underlying layers of the component.

One or more of the elements included in or otherwise used to form the fluid barrier discussed herein have a reduced volatile concentration, and cure at a rate that inhibits volatiles from negatively impacting the fluid barrier and its constituents. For example, there can be a 40%-50% reduction or greater in the volatiles included in the fluid barrier through the use of the systems and methods of fluid barrier formation discussed herein, as compared to previously employed fluid barriers. This can result because conventionally used primers can include more volatile solvents and environmentally-undesirable components such as butanone, cyclohexanone, and 2,6-dimethylheptan-4-one. In one example, a component fabricated using conventional primers can include a material with a volatile organic compound (VOC) content of about 494 grams/liter (g/L). In contrast, in one example of the primer coating material discussed herein, its VOC can be about 251 g/L, which represents a 49% decrease in the VOC content as compared to conventional primers.

The fluid barriers discussed herein are desirably formed using more environmentally sound materials as compared to previously employed fluid barriers. Further, the fluid barrier and/or components of the fluid barrier discussed herein can be removed without flaking, which also lessens the negative environmental impact. Furthermore, the methods and systems used to form the fluid barriers discussed herein are more robust, less costly and less time- and labor-intensive.

FIG. 1A is an illustration of an aircraft 100 including one or more fluid barriers utilized thereon according to aspects of the present disclosure. In this illustrative example, aircraft 100 has a first wing 102 and a second wing 104. Each of the first wing 102 and the second wing 104 is connected to a body 106. The aircraft 100 includes a first engine 108 connected to the first wing 102. The aircraft further includes a second engine 110 connected to the second wing 104. The body 106 has a tail section 112. Each of a first horizontal stabilizer 114, a second horizontal stabilizer 116, and a vertical stabilizer 118, is connected to a tail section 112 of the body 106. The aircraft 100 is an example of an aircraft having at least one composite fan cowl panel that includes a fluid barrier as described herein. For example, at least one of the first engine 108 or the second engine 110 may have a composite fan cowl panel with a fluid barrier formed thereon as described herein. In other examples, the composite fan cowl panel may have a different geometry in one or more aspects from what is shown in the first engine 108 and the second engine 110. This illustration of aircraft 100 is provided for purposes of illustrating one environment in which different aspects of the disclosure may be implemented. The illustration of aircraft 100 in FIG. 1A is not meant to imply architectural limitations as to the manner in which different illustrative aspects may be implemented. For example, the aircraft 100 is shown as a commercial passenger aircraft. The different illustrative aspects may be applied to other types of aircraft, such as a private passenger aircraft, a rotorcraft, or other suitable types of aircraft, or other assemblies or vehicles that include one or more components having fluid barriers.

Figure 1B:
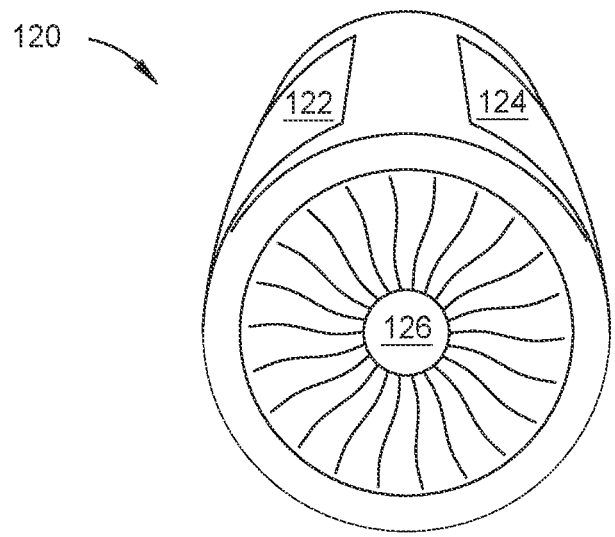
FIG. 1B is an example illustration of an engine with its fan cowl panels closed, the engine including one or more fluid barriers according to aspects of the present disclosure.

FIG. 1B is a perspective view of an exemplary engine 120 with its fan cowl panels 122, 124 in a first, closed position. The engine 120 includes one or more fluid barriers (not shown here) according to aspects of the present disclosure. The engine 120 shown in FIG. 1B may be similar to the first engine 108 or the second engine 110 in FIG. 1A. The engine 120 is illustrated with the first fan cowl panel 122 and the second fan cowl panel 124, each in a first, closed position.

Figure 1C:
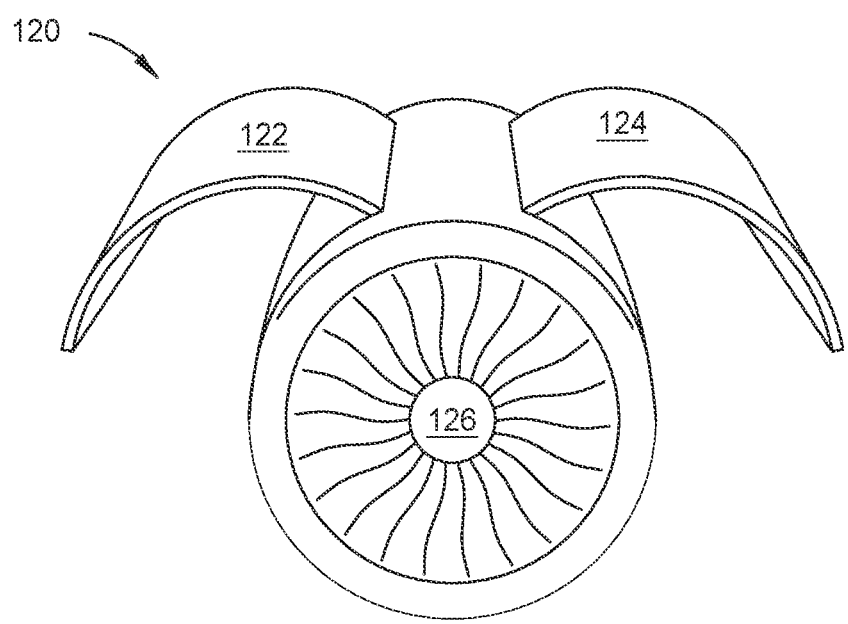
FIG. 1C is an example illustration of an engine with its fan cowl panels open, the engine including one or more fluid barriers according to aspects of the present disclosure.

FIG. 1C is a perspective view of the exemplary engine 120 from FIG. 1B with its fan cowl panels 122, 124 each configured in a second, open position. The first cowl panel 122 and the second fan cowl panel 124 are assembled to the engine 120 such that each is configurable in various positions. The first, closed position shown in FIG. 1B allows the fan cowl panels 122, 124, to protect a plurality of underlying engine components 126 when the engine 120 is in use. In contrast, in FIG. 1C, the engine 120 is illustrated with a first fan cowl panel 122 and a second fan cowl panel 124, each in a second, open position. One or both of the first fan cowl panel 122 and the second fan cowl panel 124 can be configured in the second, open position as shown in FIG. 1C, for example, during testing and inspection of the fan cowl panels (122, 124). In another example, one or both of the first fan cowl panel 122 and the second fan cowl panel 124 can each be configured in the second, open position during testing, inspection, or maintenance of the fan cowl panel (122, 124) or one or more of the underlying engine components 126.

Blast Media Cleaning

Figure 2:
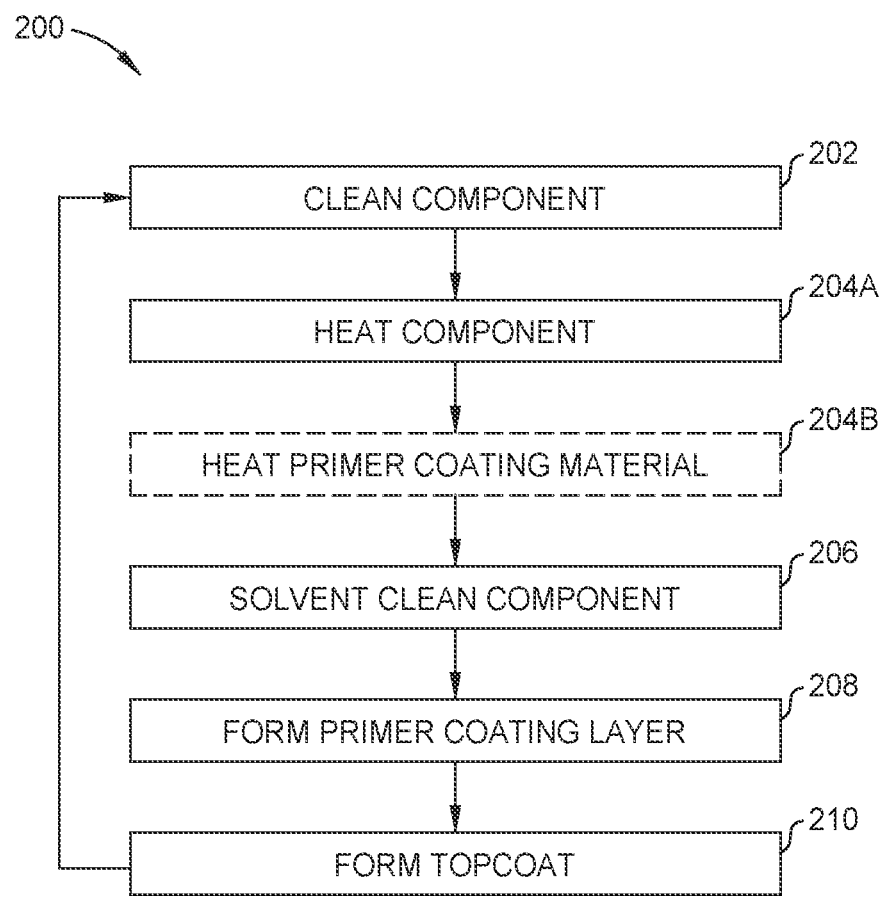
FIG. 2 is a flowchart of an advantageous aspect of a method of forming a fluid barrier according to aspects of the present disclosure.

FIG. 2 is a flowchart of an exemplary method 200 of forming a fluid barrier, according to aspects of the present disclosure. At operation 202, a component can be cleaned to remove previously-applied coatings and/or contaminants. A grit blasting operation can be performed without damaging three-dimensional structures such as carbon fibers that may be present in the component. The grit blasting can be performed on a first side of a component, such as the side of a component 300 discussed below in FIG. 3. The first side of the component can be formed from a composite material. In one example, the composite material can be a carbon fiber reinforced polymer (CFRP). In one example, which can be combined with other examples herein, the composite material can be configured as a plurality of threads or fibers such that the first side has a three-dimensional structure. In some examples, the three-dimensional structure on the first side of the component can be a woven structure of various geometries. The grit blasting at operation 202 can include the use of blast media such as wheat starch. Wheat starch grit blasting optimizes the CFRP for adhesion of subsequent finishes. In another example, the grit blasting at operation 202 can use blast media such as corn starch or plastic blasting media. In another example, other blasting media capable of removing a previously-applied coating without damaging the three-dimensional structure of the first side of the component may be selected. In contrast, manual sanding operations used to remove materials from the component can undesirably flatten the three-dimensional surface. A flattened surface can negatively impact fluid barrier formation and adhesion among other performance elements, since the fluid barrier may not adhere well to a flattened surface. In some examples, where material is not being removed from the component, for example, when the fluid barrier being formed via the method 200 is a new fluid barrier formed on a component that may not have previously included a fluid barrier, operation 202 may not be necessary. In this example, the method can begin at operation 204A as discussed below.

Preheating Component

At operation 204A, the component is heated to a temperature from about 120° F. to about 140° F. (49° C.-60° C.). Optionally, in some examples, at operation 204B, a primer coating material is heated to a temperature from room temperature to about 140° F. (60° C.). As used herein, "room temperature" can be from about 68° F. to about 77° F. (20° C.-25° C.). In one example, the component and the primer coating material can be heated within about 10° F. of each other. In another example, the component and the primer coating material can be heated within about 7° F. of each other. In another example, the component and the primer coating material can be heated within about 5° F. of each other. In another example, the component and the primer coating material are heated within about 3° F. of each other. In one example, an oven can be used to heat the component at operation 204A. In one example, the oven used can include a conveyor belt that progressively heats the component to a desired temperature as it moves through the oven. In another example, the oven used can be a stand-alone oven that is sealed to provide heating.

Preheating Primer Coating Material

In one example, the primer coating material can be heated at operation 204B in a sealed container to reduce the likelihood of contamination. The heating at operation 204B reduces the viscosity of the primer coating material to facilitate penetration of the primer coating material into the three-dimensional structure of the component, which improves adhesion of the fluid barrier thereto and therein. In one example, a target range of viscosity for the primer coating material can be used instead of or in addition to a temperature parameter to prepare the primer coating material at operation 204B. In one example, a viscosity for the primer coating material after heating at operation 204B is from 1500 centipoise-about 3300 centipoise. In another example, a viscosity of the primer coating material is selected such that the primer coating material can flow into the three-dimensional structure of the component. Depending on the component, the three-dimensional structure can be one or more of macro-, micro- or nanofeatures, such as pores, holes, and other features that the fluid barrier can be drawn into in order to create a robust fluid barrier. As discussed herein, "macro" features are visible to the naked eye without magnification, "micro" features can have one or more dimensions on the order of about $1\times^{-7}$ meters (m) to about $1\times^{-4}$ m, and "nano" features can have one or more dimensions on the order of about $1\times^{-9}$ m to about $0.9\times^{-7}$ m.

Solvent Clean Component

At operation 206, the component is cleaned with a solvent. The cleaning at operation 206 can remove contaminants or debris which may have been released from the composite material during the heating at operation 204A. For example, if the composite material is formed from fibers or threads, those structures may retain contaminants that can be released during heating when the threads swell, e.g., when the threads expand in response to heating at operation 204A. The cleaning at operation 206 can be performed using one or more solvents. In one example, the solvent used at operation 206 can be a ketone. In other examples, the solvent can be one or more of isopropyl alcohol (IPA), acetone, naphtha, denatured alcohol, sec-butyl alcohol, toluene, or ketones including: methyl ethyl ketone (MEK), methyl propyl ketone (MPK), or methyl isobutyl ketone (MIBK), or other solvents or combinations of solvents as appropriate for removing contaminants and debris. In one example, the solvent used at operation 206 can be selected for its evaporation rate. The solvent helps to lower the temperature of the component prior to downstream operations. In one example, when the component cools before or during formation of the primer coating layer at operation 206, creating a pressure differential between the inside and the outside of the component. Because of this pressure differential, the air outside of the primer coating layer can migrate into the component and cause the primer coating material to be more efficiently pulled into voids including holes, crevices, pores, and other features of the three-dimensional structure. This creates improved adhesion of the fluid barrier to the component which improves the ability of the fluid barrier to prevent fluid ingression. In one example, the temperature of the component is maintained within the range from about 120° F. to about 140° F. (49° C.-60° C.) during the cleaning at operation 206. In one example, the temperature of the component during operation 206 may be less than the temperature of the component during operation 204A. In some embodiments, the component is solvent cleaned at operation 206 immediately after heating, such as heating in an oven at operation 204A, prior to sealant primer application as discussed below. In one example, solvent cleaning at operation 206 can last for up to 15 minutes.

Primer Coating Layer

At operation 208, a primer coating layer is formed from the primer coating material on the first side of the component. The primer coating material can include a polymer-based material selected for properties including viscosity, viscosity within a particular temperature range, adhesion to the composite material, and/or adhesion to other layers of the fluid barrier. In one example, the primer coating material can be polyurea. In another example, which can be combined with other examples herein, the primer coating material can be polysulfide. In other examples, the primer coating material can be selected for its adhesion, viscosity, or other properties as appropriate for fluid barrier formation. In one example, the primer coating layer is formed at operation 208 while the temperature of the component is maintained within the range of about 120° F. to about 140° F. (49° C.-60° C.). In another example, the primer coating layer is formed at operation 208 while the temperature of the component is from about room temperature (68° F.-77° F.) to about 120° F. In one example, the temperature of the component during primer coating layer formation is the same as the temperature of the component after the component is heated at operation 204A. In another example, the temperature of the component during primer coating layer formation is from about 50% to about 99% of the temperature of the component after the component is heated at operation 204A. In still another example, the temperature of the component during primer coating layer formation is from about 65% to about 80% of the temperature of the component after the component is heated at operation 204A.

The primer coating material can be applied via a spray-on operation. In one example, the spray-on operation, which can include one or more full or partial passes over the component, forms a continuous coating on the three-dimensional structure of composite material on the first side of the component. In one example, which can be combined with other examples herein, the primer coating layer formed cures at or below about room temperature (68° F.-77° F.). In aspects of the fluid barrier and fluid barrier formation discussed herein, where two or more interlayers of primer coating comprise the primer coating layer, subsequent interlayers of primer coating material can be formed on each other without re-heating the component or the primer coating material.

In one example, the primer coating layer is formed as a single, continuous layer. In another example, the primer coating layer is formed as a plurality of primer coating interlayers. In one example of forming primer coating interlayers, a first primer coating interlayer of the primer coating material is applied to one or more areas on the first side of the component. In this example, the one or more areas where the primer coating material is applied can include less than the entire surface area of the component. In this example, a second primer coating interlayer can be subsequently applied to the same one or more areas, or one or more to different, uncoated areas. In another example, the second coating primer interlayer can be applied to one or more areas overlapping the first primer coating interlayer. In another example, the second primer coating interlayer or a third primer coating interlayer can be applied to the entire surface area of the first side of the component. A predetermined time in between the formation of the respective interlayers may be selected such that the first primer coating interlayer has not yet gelled or cured at the time the second primer coating interlayer is formed. In one example, the second primer coating interlayer can be formed from about 1 minute to about 7 minutes after the first primer coating interlayer is formed. In other examples, the second primer coating interlayer can be formed after the first primer coating interlayer is formed. In one example, the primer coating is applied multiple spraying apparatuses. In one example, two or more spraying apparatuses can be used to apply sealant primer to two areas that exhibit the worst fluid ingression in order to leverage the pre-heated component cool-down cycle to prevent pitting and/or bubbles and other non-uniformities from forming in the primer coating. In some examples, two or more spraying apparatuses can be used simultaneously. In other examples, two or more spraying apparatuses can be used independently in an alternating or other manner. In still other examples, two or more spraying apparatuses can be used in a partially overlapping manner.

In an example, the thickness of the primer coating layer formed can range from about 0.010" (inches) to about 2.0." In another example, the thickness of the primer coating layer can range from about 0.010" to about 0.5." In another example, the thickness of the primer coating layer can range from about 0.010" to about 0.030." The primer coating layer formed creates a fluid barrier that has improved cohesive strength, improved puncture resistance, and improved bonding to the first side of the component. Once formed, the primer coating layer can be removed via peeling without damaging the three-dimensional structure of the first side of the component. The primer coating layer may be removed, for example, if a thinner layer is desired, if contaminants are found in the primer coating layer after formation, or in other contexts where it may be desirable to remove the primer coating layer and re-execute one or more of operations 202, 204A, 204B, 206, and 208 of the method 200.

Topcoat Layer

Subsequent to operation 208, at operation 210, a topcoat layer is formed over the primer coating layer. The material selected for the topcoat layer formed at operation 210 can be selected based on one or more properties including its resistance to fluid ingression, ability to adhere to the primer coating layer formed at operation 208, its optical (reflective) properties, or surface roughness. In embodiments, the topcoat layer applied at operation 210 further seals the primer coating layer and increases the resistance of the primer coating layer to fluid ingression. In one example, the topcoat layer is a continuous layer formed over the entire surface area of the first side of the component. The material used for the topcoat layer can include a reflective material. As discussed herein, a "reflective" material is one that, when dried or otherwise ready for use, reflects light within the visible light spectrum from about 380 nm to about 740 nm. The reflective material can be various colors, combinations of colors, or patterns of one or more colors and/or markings. In one example, the topcoat layer is formed from polyurethane. In another example, the topcoat layer is formed from reflective polyurethane, for example, white reflective polyurethane. The topcoat layer can be formed by spraying the topcoat material on top of the primer coating layer. The topcoat layer adheres to the primer coating layer and seals the fluid barrier. The topcoat layer can be from about 0.0010" to about 0.020." In other examples, the topcoat layer can be from about 0.0010" to about 0.0030." The topcoat layer can be applied while the topcoat material is at room temperature (68° F.-77° F.). In another example, the topcoat material can be heated to above room temperature (e.g., above about 77° F.) prior to the topcoat layer formation. In one example, the topcoat layer is formed while the component is at from about room temperature (about 68° F. to about 77° F.) to about 140° F.

In one example, the topcoat layer is formed in a single application. The topcoat layer can be formed by spraying in a manner similar to the formation of the primer coating layer. In another example, the topcoat layer is formed in a plurality of applications as a plurality of topcoat interlayers. In this example, each topcoat interlayer of the plurality of topcoat interlayers that form the topcoat layer can be uniform in thickness. In another example, two or more topcoat interlayers of the plurality of topcoat interlayers that form the topcoat can vary in thickness within a topcoat interlayer and/or between different topcoat interlayers. In one example, the topcoat layer is formed over the primer coating layer in consecutive operations, for example, at an original equipment manufacturer (OEM). In another example, the primer coating layer can be formed, for example, at a first OEM location, and the topcoat layer can be formed thereafter. For example, the topcoat layer can be formed at a customer site or in a second, different OEM location as compared to the location where the primer coating layer is formed.

The topcoat layer can be formed in one or more operations and can include one layer or a plurality of interlayers. In one example, the topcoat layer is formed as a single, continuous layer. In another example, the topcoat layer is formed as a plurality of interlayers. In one example of interlayer formation, a first topcoat interlayer of the topcoat is applied to one or more areas on the first side of the component. In this example, the one or more areas where the topcoat material is applied include less than the entire surface area of the component. In this example, a second topcoat interlayer can be subsequently applied to the same one or more areas, or to different, uncoated layers. In another example, the second topcoat interlayer can be applied to areas overlapping the first topcoat interlayer. In another example, the second topcoat interlayer or a third topcoat interlayer can be applied to the entire surface area of the first side of the component. The respective thickness of each topcoat interlayer can be similar, or may vary, depending upon the aspect of the fluid barrier.

In some examples, the fluid barrier formed in the method 200 may be removed, for example, if contamination or coating inconsistency occurs, or if internal specifications or customer specifications are revised. In this example, the fluid barrier can be removed by peeling the topcoat and primer coating layer off of the first side of the component. The removal can be performed without damaging the underlying three-dimensional structure, in contrast to previous materials that flaked or are dissolved.

Figure 3:
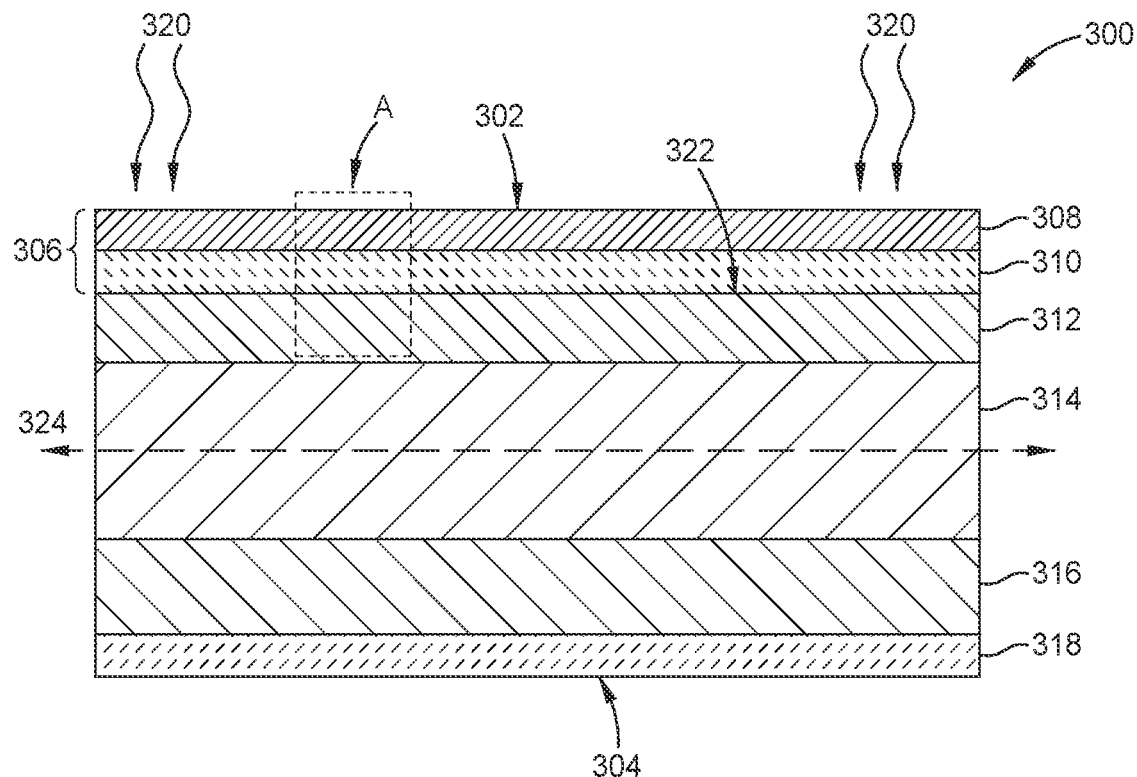
FIG. 3 is an illustration of an example component including a fluid barrier according to aspects of the present disclosure.

FIG. 3 is a partial sectional view of an exemplary component 300 having a fluid barrier 306 according to aspects of the present disclosure formed thereon. The component 300 shown has a first side 302 opposite a second side 304. While the first side 302 is shown to be about parallel to the second side 304 in FIG. 3, this is one aspect of the component 300. In other aspects, component 300 or other components including the fluid barrier 306 can have one or both of the first side 302 or the second side 304 curved, stepped, tapered, or otherwise configured relative to a central horizontal axis 324. The component 300 is susceptible to fluid ingression from the first side 302 into the core layer 314, as indicated by the arrows 320. However, the fluid barrier 306 prevents or reduces fluid ingression, thus preserving the integrity of the component 300.

In one example, the fluid barrier 306 includes a topcoat layer 308 and a primer coating layer 310. The primer coating layer 310 is in contact with the topcoat layer 308. The primer coating layer 310 can be formed as discussed above at operation 208 in the method 200. The primer coating layer 310 can be formed via spraying-on polyurea or polysulfide. As discussed above, the primer coating layer 310 can be formed to be from about 0.010" to about 2.0" thick. The topcoat layer 308 is formed on the first side 302 of the component 300. The topcoat layer 308 can be formed via operation 210 as discussed in the method 200. In one example, the topcoat layer 308 is formed from polyurethane. In another example, which can be combined with other examples herein, the topcoat layer 308 is formed from reflective polyurethane. The topcoat layer 308 can be formed to have a total thickness from about 0.0010" to about 0.020." In one example, the thickness of the topcoat layer 308 is uniform across the component 300. In another example, the thickness of the topcoat layer 308 varies across the component 300.

The primer coating layer 310 adheres to a first surface 322 of a first intermediate composite layer 312. The first intermediate composite layer 312 can be from about 0.0025" to about 0.15" in thickness. The first intermediate composite layer 312 can include one or more layers of varying thickness and/or composition, including composite materials, adhesive materials, and combinations thereof. In one example, the first surface 322 is formed from a composite material. In one example, the first surface 322 can be formed as a three-dimensional surface from a plurality of threads, fibers, or other configurations of the composite material. In one example, which can be combined with other examples herein, the first surface 322 is formed as a woven, three-dimensional structure. When fluids are introduced to the first side 302, as shown by the arrows 320, the three-dimensional structure of the first surface 322 can swell, creating bubbles or other deformities in previously used film and tape fluid barriers.

Further in FIG. 3, a core layer 314 is in contact with the first intermediate composite layer 312. In one example, the core layer 314 is formed from a composite material that may be the same as, similar to, or different in composition from the other composite materials discussed herein. In one example, which can be combined with other examples herein, the core layer 314 can be from about 0.15" to about 1.0" thick. In one example, the composite material used to form the core layer 314 can be the same as the composite material used to form the first surface 322 of the first intermediate composite layer 312. In another example, the composite material used to form the core layer 314 can be a different type of composite material than the composite material used to form the first surface 322 of the first intermediate composite layer 312. In yet another example, the composite material used to form the core layer 314 can be configured in a three-dimensional structure. In some aspects of the component 300, the three-dimensional structure of the core layer 314 includes a "honeycomb" structure. As discussed herein, a "honeycomb" structure can be an arrangement of multi-sided hollow cells of various geometries.

Further in the component 300, a second intermediate composite layer 316 is in contact with the core layer 314. The second intermediate composite layer 316 can include one or more interlayers of varying composition and/or thickness. In one example, the second intermediate composite layer 316 can be from about 0.015" to about 0.25" thick. In another example, the second intermediate composite layer 316 can include one or more composite materials. A second topcoat layer 318 is in contact with the second intermediate composite layer 316. The second topcoat layer 318 can be from about 0.0010" to about 0.020". In one example, the second topcoat layer 318 can be formed from polyurethane. In another example, which can be combined with other examples herein, the second topcoat layer 318 is formed from the same material as the topcoat layer 308 of the fluid barrier 306. In yet another example, which can be combined with other examples herein, the second topcoat layer 318 is formed from a material that includes at least one of a different composition, a different color, or a different reflectivity as compared the topcoat layer 308 of the fluid barrier 306.

Figure 4:
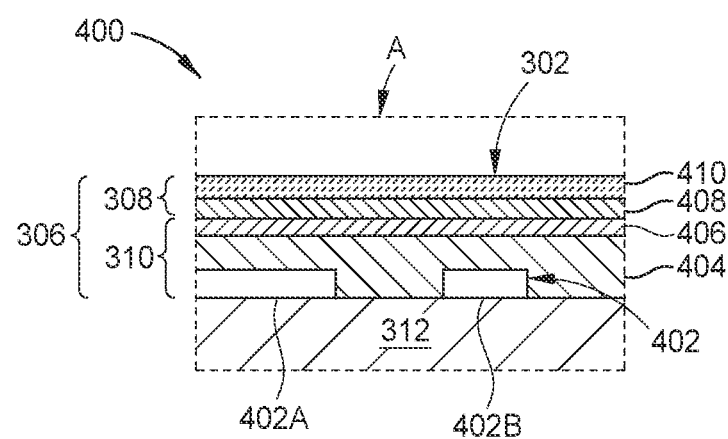
FIG. 4 is an illustration of a portion of an example component including a fluid barrier according to aspects of the present disclosure.

FIG. 4 is an illustration of a portion "A" of component 300 from FIG. 3. FIG. 4 illustrates an aspect 400 of the fluid barrier 306 where one or more of the primer coating layers 310 or the topcoat layer 308 are formed as a plurality of interlayers. In the fluid barrier 306, an example of a first primer coating interlayer 402 includes a first portion 402A and a second portion 402B. Each of the first portion 402A and second portion 402B can be formed on areas of the underlying layer (second composite material layer 316) that may have more damage from fluid ingression than the surrounding areas. A second primer coating interlayer 404 is formed in contact with the first portion 402A and second portion 402B of the first primer coating interlayer 402. A third primer coating interlayer 406 of the primer coating layer 310 can be formed in contact with the second primer coating interlayer 404. Each of the second primer coating interlayer 404 and the third primer coating interlayer 406 can vary in thickness. In another example, which can be combined with other examples, each of the first portion 402A and second portion 402B of the first primer coating interlayer 402 can differ in thickness as compared to each other or as compared to the second primer coating interlayer 404 or the third primer coating interlayer 406. In another example, each of the first portion 402A and second portion 402B of the first primer coating interlayer 402 can differ in thickness or cross-sectional geometry. In still another example, each of the first portion 402A and second portion 402B of the first primer coating interlayer 402 can have a similar thickness.

A total thickness of the primer coating layer 310, which in one example includes the first portion 402A, the second portion 402B, the second primer coating interlayer 404, and the third primer coating interlayer 406, can be from about 0.010" to about 2.0." Further illustrated in FIG. 4 is an exemplary topcoat layer 308 that includes a first topcoat interlayer 408 formed on the primer coating layer 310, and a second topcoat interlayer 410 formed on the first topcoat interlayer 408. Each of the first topcoat interlayer 408 and the second topcoat interlayer 410 are illustrated in FIG. 4 as being continuous in the portion "A" of the fluid barrier 306. In some examples, which can be combined with other examples herein, the first topcoat interlayer 408 can be formed in portions, similar to the first portion 402A and second portion 402B of the first primer coating interlayer 402 of the primer coating layer 310. The second topcoat interlayer 410 forms the first side 302 of the component 300. In one example, the total thickness of the topcoat layer 308, including the first topcoat interlayer 408 and the second topcoat interlayer 410, is from about 0.002" to about 0.003." In one example, the first topcoat interlayer 408 can differ in thickness from the thickness of the second topcoat interlayer 410. In another example, the first topcoat interlayer 408 is about the same thickness as the second topcoat interlayer 410. In FIG. 4, primer coating layer 310 and the topcoat layer 308 are illustrated as having two or more interlayers.

In other aspects of the fluid barrier 306, only one of the primer coating layer 310 or the topcoat layer 308 may include two or more interlayers.

In the current disclosure, reference is made to various aspects. However, it should be understood that the present disclosure is not limited to specific described aspects. Instead, any combination of the features and elements described herein, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s). It is further contemplated that the use of the term "about" shall mean that the recited parameter, feature, or measurement is within 1%, 3%, or 5% of the stated value or range.

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon. Accordingly, one or more elements of the systems and methods disclosed herein can be implemented by executing computer readable code.

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. These computer program instructions may be provided such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner. These computer program instructions may be stored such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A panel comprising:
   a core layer comprising an arrangement of multi-sided hollow cells in a honeycomb structure, the core layer comprising a first side and a second side;
   a first intermediate composite layer on the first side of the core layer, wherein the first intermediate composite layer comprises a fiber reinforced polymer;

a second intermediate composite layer on the second side of the core layer, wherein the second intermediate composite layer comprises a fiber reinforced polymer;
a fluid barrier on the first intermediate composite layer, the fluid barrier comprising:
   a primer coating layer formed directly on the first intermediate composite layer; and
   a first topcoat layer on the primer coating layer; and
a second topcoat layer on the second intermediate composite layer,
wherein the first intermediate composite layer comprises macrofeatures, wherein the primer coating layer is disposed within the macrofeatures.

2. The panel of claim 1, wherein the primer coating layer comprises at least one of polyurea and polysulfide.

3. The panel of claim 1, wherein the first topcoat layer comprises polyurethane.

4. The panel of claim 1, wherein the second topcoat layer comprises polyurethane.

5. The panel of claim 1, wherein the first intermediate composite layer comprises microfeatures, wherein the primer coating layer is disposed within the microfeatures.

6. The panel of claim 1, wherein the first intermediate composite layer comprises nanofeatures, wherein the primer coating layer is disposed within the nanofeatures.

7. The panel of claim 1, wherein the primer coating layer is about 0.010" to about 0.030" in thickness.

8. The panel of claim 1, wherein the topcoat layer is about 0.0010" to about 0.0030" in thickness.

9. The panel of claim 1, wherein the primer coating layer has a volatile organic compound (VOC) content that is at least 40% reduced compared with a primer having a volatile organic compound (VOC) content of about 494 grams/liter (g/L) such that the primer coating has a volatile organic compound (VOC) content of about 296 g/L or less.

10. The panel of claim 1, wherein the primer coating layer has a volatile organic compound (VOC) content that is 40%-50% reduced compared with a primer having a volatile organic compound (VOC) content of about 494 grams/liter (g/L) such that the primer coating has a volatile organic compound (VOC) content in a range of about 247 g/L to about 296 g/L.

11. The panel of claim 1, wherein the primer coating layer has a volatile organic compound (VOC) content of about 251 g/L.

12. The panel of claim 1, wherein the primer coating layer is formed from a plurality of primer coating interlayers, wherein the plurality of primer coating interlayers including first primer coating interlayer and a second primer coating interlayer, wherein the first primer coating interlayer has different thickness than the second primer coating interlayer.

13. The panel of claim 1, wherein the first intermediate composite layer comprises a woven structure.

14. The panel of claim 1, wherein the first topcoat layer is a reflective polyurethane material.

15. The panel of claim 1, wherein the primer coating layer comprises multiple interlayers, wherein the plurality of primer coating interlayers including first primer coating interlayer and a second primer coating interlayer, wherein the first primer coating interlayer is applied over a different area of the first intermediate composite layer than the second primer coating interlayer layer.

16. A panel comprising:
a core layer comprising an arrangement of multi-sided hollow cells in a honeycomb structure, the core layer comprising a first side and a second side;
a first intermediate composite layer on the first side of the core layer, wherein the first intermediate composite layer comprises a fiber reinforced polymer;
a second intermediate composite layer on the second side of the core layer, wherein the second intermediate composite layer comprises a fiber reinforced polymer;
a fluid barrier on the first intermediate composite layer, the fluid barrier comprising:
   a primer coating layer formed directly on the first intermediate composite layer; and
   a first topcoat layer on the primer coating layer; and
a second topcoat layer on the second intermediate composite layer,
wherein the first intermediate composite layer comprises microfeatures, wherein the primer coating layer is disposed within the microfeatures.

17. The panel of claim 16, wherein the primer coating layer is formed from a plurality of primer coating interlayers, wherein the plurality of primer coating interlayers including first primer coating interlayer and a second primer coating interlayer, wherein the first primer coating interlayer has different thickness than the second primer coating interlayer.

18. The panel of claim 16, wherein the first intermediate composite layer comprises a woven structure.

19. The panel of claim 16, wherein the first topcoat layer is a reflective polyurethane material.

20. A panel comprising:
a core layer comprising an arrangement of multi-sided hollow cells in a honeycomb structure, the core layer comprising a first side and a second side;
a first intermediate composite layer on the first side of the core layer, wherein the first intermediate composite layer comprises a fiber reinforced polymer;
a second intermediate composite layer on the second side of the core layer, wherein the second intermediate composite layer comprises a fiber reinforced polymer;
a fluid barrier on the first intermediate composite layer, the fluid barrier comprising:
   a primer coating layer formed directly on the first intermediate composite layer; and
   a first topcoat layer on the primer coating layer; and
a second topcoat layer on the second intermediate composite layer,
wherein the first intermediate composite layer comprises nanofeatures, wherein the primer coating layer is disposed within the nanofeatures.

* * * * *